No. 645,774. Patented Mar. 20, 1900.
A. WYDTS & G. WEISSMANN.
CONTINUOUS CURRENT TRANSFORMER.
(Application filed May 12, 1899.)
(No Model.)
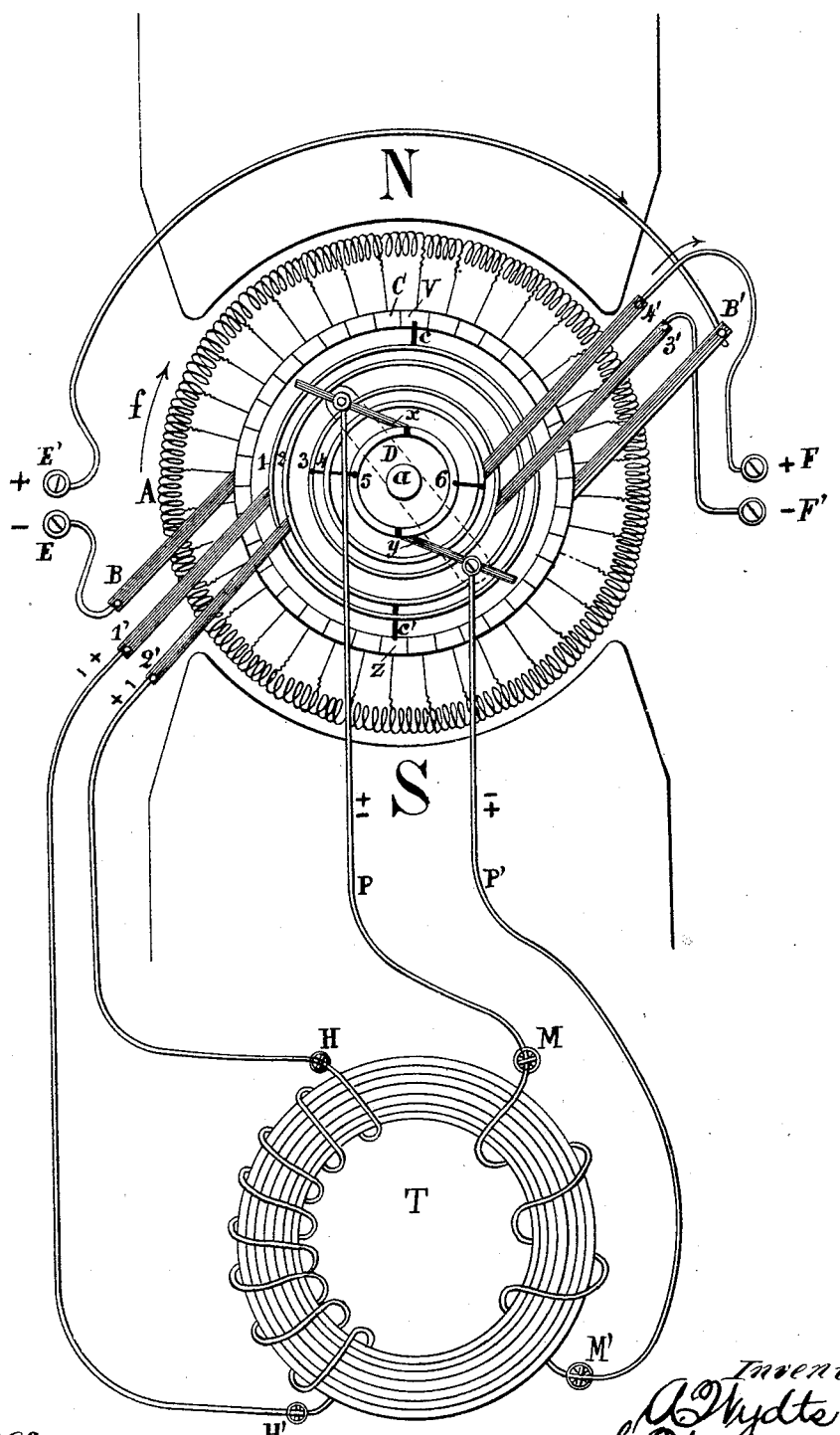

UNITED STATES PATENT OFFICE.

ALFRED WYDTS AND GUSTAVE WEISSMANN, OF PARIS, FRANCE.

CONTINUOUS-CURRENT TRANSFORMER.

SPECIFICATION forming part of Letters Patent No. 645,774, dated March 20, 1900.

Application filed May 12, 1899. Serial No. 716,568. (No model.)

*To all whom it may concern:*

Be it known that we, ALFRED WYDTS, electrical engineer, of 339 Rue des Pyrénées, and GUSTAVE WEISSMANN, engineer, of 3 Rue Chaptal, Paris, in the Republic of France, have invented an Improved Method of and Apparatus for Transforming Continuous Electric Currents into Continuous Currents of Different Voltage, of which the following is a full, clear, and exact description.

This invention relates to a novel method of transforming continuous electric currents into currents of different voltage for the purpose of enabling the utilization of a continuous current supplied at the fixed tension by any source of electricity.

Our invention consists in principle in rendering a continuous current alternating in order to enable it to be readily transformed by means of electromagnetic induction, the secondary alternating current of this transformer being then rectified by means of a commutator operated by the same mechanical device as that employed for rendering the original continuous current alternating in such a manner that the secondary alternating current is rectified isochronously, because the phases of the secondary current, although lagging behind or displaced relatively to those of the primary current, are isochronous with them—that is, the intervals separating the phases of the secondary current are equal to those separating the phases of the primary current. Our method of current transformation therefore comprises in principle the following operations: first, passing the continuous current, the voltage of which is to be either increased or diminished, into the armature of a continuous-current motor in such a manner that this continuous current is transformed into an alternating current; second, causing this alternating current to pass into the primary circuit of an electromagnetic transformer of any suitable kind in order to obtain in the secondary circuit an alternating current of the desired voltage; third, rectifying this alternating current, which has been brought to the desired voltage in the manner described, by means of a rectifying or redressing commutator operatively connected with the device which has transformed the original continuous current into an alternating one—for instance, the rectifying-commutator may be keyed upon the same axis as the collectors which have produced the deformation of the original continuous current in such a manner that isochronism is assured between the emissions of the inducing-current and those of the rectified secondary alternating current.

In order that our invention may be readily understood, we have represented by way of example in the accompanying drawing a method of practically carrying the same into effect.

Between the poles of a magnet or of an electromagnet NS there is displaced in the direction indicated by the arrow *f* a dynamo-armature A of the Gramme type, for example, provided with a collector C and two brushes B and B'. Upon the same axis as the collector C and rotating with it are fixed four continuous collecting-rings 1 2 3 4, communicating, respectively, with four brushes 1' 2' 3' 4', which rest upon them, and two half-rings 5 and 6, each of which comes in contact alternately first with the brush $x$ and then with the brush $y$, according to the position of these two half-rings, which rotate, and are consequently displaced with respect to the two brushes $x$ and $y$, which are fixed. These two brushes are suitably insulated and supported at the extremities of a cross-piece D, resembling the brush-holder of an ordinary bipolar dynamo. This part D, which for the purpose of adjustment is capable of being turned about the axis $a$, enables the brushes $x$ and $y$ to be brought into a suitable commutation plane.

The continuous collecting-rings 1 and 2 are respectively in communication with two strips V Z of the collector C, which are diametrically opposite one to the other. The rings 3 and 4 communicate, respectively, with the two half-rings 5 and 6, which constitute the rectifying-commutator. The brushes B and B' are in communication, respectively, with the primary terminals E and E', through which the continuous current to be transformed enters. The brushes 3' and 4' are in communication with the secondary terminals F and F', at which the resulting transformed continuous current is collected. The brushes 1' and 2' are connected with the terminals H H', at which terminate the extremities of the primary wire of the monophase transformer T. The two extremities of the secondary wire of this transformer terminate at the two terminals M M', which are connected to the brushes $x$ and $y$ of the rectifying-commutator.

This novel form of apparatus operates in the following manner: When a continuous current is conducted to the terminals E E', the ring A commences to rotate and its velocity increases until the counter electromotive force developed in its coils tends to balance the electromotive force which produces the movement.

The primary circuit of the transformer T by means of the brushes 1' and 2' and of the rings 1 and 2 is the seat of an alternating electromotive force, the tension or voltage of this electromotive force being equal to that of the continuous current which passes through the brushes B B' when these latter are in contact with the strips V Z of the collector C. This tension is also equal in absolute value to the tension of this current, but with the — sign when the collector has become displaced through one hundred and eighty degrees in the direction of rotation, (indicated by the arrow $f$,) and it becomes zero when, as shown in the drawing, the diameter which joins the strips V Z is at right angles to the diameter which joins the brushes B and B' at their point of contact with the collector. An alternating electromotive force is thus produced in the primary circuit of the transformer T. The secondary circuit is then the seat of an alternating electromotive force, the tension of which, as is well known, is a function of the ratio of the number of primary windings to the number of secondary windings. It is also well known that the phase of this secondary electromotive force is displaced by a certain angle with respect to that of the primary electromotive force. It is for this reason that the brushes $x\ y$, which are in communication with the extremities of the secondary circuit, may be displaced themselves, as above stated, by means of a cross-piece D, which supports them. It is therefore only necessary to ascertain the angle of adjustment, which gives the maximum of electromotive force at the terminals F F'. The alternating current supplied by the secondary circuit of the transformer T is conducted by the brushes $x\ y$ to the two half-rings 5 and 6 of the rectifying-commutator in electrical communication with the two continuous rings 3 4, against which the brushes 3' 4', connected with the terminals F F', bear. When the direction of the current changes in the brushes $x\ y$, the said brushes shift from the half-ring or sector 5 to the sector 6, and vice versa, and the current which reaches the terminals F F' is therefore practically continuous.

Our invention enables a continuous current to be transformed without transforming the electrical energy into dynamic energy and the dynamic energy into electrical energy, the process which has hitherto been employed and of which the efficiency is known to be very low.

Our novel form of transformer, which may be employed for any voltage, is especially adapted for enabling the employment of the current supplied by public distributing-stations at a tension of from one hundred and ten to one hundred and twenty volts for all applications which require either a greater or a smaller voltage, it being very rarely the case that, apart from illuminating purposes, the voltage of stations for the distribution of electricity is applicable indifferently to the various uses of which the electric current is capable. For example, it is frequently required to charge a secondary battery which may occasionally comprise no more than three or four elements. Assuming that it is desired to charge a battery of four elements each having fifty kilograms of plates, it would be necessary, if the elements are connected for tension, to employ a current of five hundred and twenty watts at 10.4 volts in the proportion of 2.6 volts per element; but seeing that a current of one hundred and ten volts only is available it would be necessary to interpose in the path of the charging-current a rheostat capable of absorbing the difference— that is to say, a rheostat of $\dfrac{99.6\ v}{50\ a} = 2$ ohms. The energy thus transformed into heat and entirely wasted amounts to $50\ a \times 99.6\ v = 4,980$ watts per second. As the charging of the elements would be completed in ten hours at this rate, it would be necessary to absolutely waste 49.8 kilowatt hours in order to charge this battery of four kilowatt hours only. It is practically the same thing in the case of the charging of electric-motor vehicles as at present performed by means of the ordinary current supplied to private persons by public distributing-stations. Electrotypers also are unable to utilize the ordinary town current for their work, as, seeing that they require a maximum force of five to six volts, a very large part of the energy would be wasted in the manner above described. If it is a question of distributing motive force to small industries where motors of two to three kilogram meters are sufficient, a low-tension current is still to be preferred, because it is an extremely costly and a very delicate operation to construct small motors capable of operating normally with a current of one hundred and ten volts, or thereabout. Ten or twenty volt motors, on the other hand, are large wire motors. They are also strong and may be readily and inexpensively constructed. The same thing holds good with regard to lighting purposes. Low-tension lamps have a short and thick filament and one which is consequently not fragile. They are capable of supporting a current far greater than that to which lamps provided with fine filaments can be exposed with impunity. The result is a higher illuminating power.

Electrolysis in general, electrometallurgy, the use of electric furnaces, &c., require intense currents of relatively-low tension, which hitherto always necessitated special installations, as the ordinary town current does not give satisfactory results. With our device, on the other hand, electrotyping, the charging of secondary batteries, &c., may be carried out under very good conditions, as the secondary current is absolutely *nil* at the moment when the brushes $x\ y$ pass onto different half-rings upon the rectifying-commutator. Consequently there is no fear of sparking taking place upon this commutator, and the brushes $x\ y$ may therefore completely leave one half-ring before coming in contact with the other half-ring. As a result of this the two terminals F F', which by means of the collecting-rings 3 4 are in communication with the rectifying-commutator, are never short-circuited, a result which has not hitherto been obtained with ordinary rectified-current machines. In the case of other applications of which the electric current is capable it may, on the contrary, be necessary to increase the tension. A continuous-current transformer is indispensable in this case also. Many forms of continuous-current rotary transformers are in existence; but their low efficiency is well known. (They are of the coupled motor and dynamo type). In the case of low powers especially their efficiency does not always attain twenty-five per cent. For this reason the employment of a rheostat, although also extremely wasteful, is often preferred on account of its great simplicity.

Our form of transformer enables still further combinations to be obtained. Thus if instead of taking the current at the terminals F F' it is taken at M M' an alternating current may be obtained which is of either low or high tension, according to the method of winding the transformer, or an alternating current of the same maximum tension or voltage as the original continuous current may be obtained at H H'. The mean or efficient electromotive force of said alternating current is about seven-tenths of the electromotive force of the original continuous current, for if the continuous electromotive force at E E' is called $\varepsilon$, the efficient alternating electromotive force $\varepsilon'$ at H H' is $$\varepsilon' = \frac{\sqrt{2}}{2}\varepsilon,$$

which for an electromotive force of one hundred and ten volts at the terminals at E E', for example, gives an efficient alternating electromotive force of $$\varepsilon' = \frac{1,415}{2}.\ 110 = 77.7\ \text{volts.}$$

In our form of transformer the two extremities of the secondary circuit of the electromagnetic transformer T may be connected with the terminals F F', which correspond to the brushes 3' 4', and the rectified current is then obtained upon the brushes $x\ y$. We also reserve the right to employ in our novel apparatus a multipolar electric motor for the purpose either of increasing the frequency of the current or of actuating polyphase transformers.

It will of course be understood that we are at liberty to establish our novel transformer in any suitable form to vary the dimensions and the constructional details according to the various applications of which it is capable without in any way altering the principle of our invention.

We claim—

1. An electrical apparatus comprising a direct-current generator, stationary current-conveying devices, such as brushes, connected with said generator, field-magnets, a rotary armature consisting of coils and collector-sections the number of which is greater than that of said current-supply brushes, which are adapted to engage said sections, stationary collecting devices for taking an alternating current off the same collector-sections as they rotate with the armature, a transformer for converting the said alternating current into one of different voltage, and a rectifier operatively connected with the armature to move synchronously therewith, said rectifier consisting of a rotary ring divided into as many sections as there are pole-pieces of the field-magnets, stationary brushes connected with the secondary coil of the transformer and engaging said ring, a plurality of continuous rotary rings, one for each section of the divided ring and connected with said sections individually, and stationary collecting-brushes engaging said continuous rings.

2. An electrical apparatus comprising a direct-current generator, stationary current-conveying devices, such as brushes, connected with said generator, field-magnets, a rotary armature consisting of coils and collector-sections the number of which is greater than that of said current-supply brushes, which are adapted to engage said sections, stationary collecting devices for taking an alternating current off the same collector-sections as they rotate with the armature, a transformer for converting the said alternating current into one of different voltage, and a rectifier operatively connected with the armature to move synchronously therewith, said rectifier consisting of a rotary ring divided into as many sections as there are pole-pieces of the field-magnets, stationary brushes connected with the secondary coil of the transformer and engaging said ring, a plurality of continuous rotary rings, one for each section of the divided ring and connected with said sections individually, and stationary collecting-brushes engaging said continuous rings, said transformer-brushes being secured to an adjustable support mounted to swing about the axis of rotation of the rectifier-rings.

3. An electrical apparatus comprising field-magnets, a rotary armature, stationary devices, such as brushes, for conveying a current to said armature, collecting devices for taking an alternating current off the same points of the armature as said points rotate with the armature, a transformer for converting the said alternating current into one of different voltage, and a rectifier consisting of a ring rotating with the armature and divided into as many sections as there are pole-pieces of the field-magnets, a number of continuous rings rotating with the armature and each connected with one of the sections of the divided ring, and stationary collecting devices, such as brushes, engaging the continuous rings and the section-ring respectively, one set of said collecting devices being connected with the transformer, and the other with the consumption apparatus, and a support carrying those collecting-brushes which engage the sectional ring, said support being mounted to turn, for adjustment, about the axis of the armature.

4. An electrical apparatus comprising field-magnets, a rotary armature, stationary devices, such as brushes, for conveying a current to said armature, a direct-current generator connected with said brushes, collecting devices for taking an alternating current off the same points of the armature as said points rotate with the armature, a transformer for converting the said alternating current into one of different voltage, and a rectifier operatively connected with the armature to move synchronously therewith, to convert the last-mentioned alternating current into a continuous one.

5. An electrical apparatus comprising field-magnets, a rotary armature, stationary devices, such as brushes, for conveying a current to said armature, a direct-current generator connected with said brushes, collecting devices for taking an alternating current off the same points of the armature as said points rotate with the armature, a transformer for converting the said alternating current into one of different voltage, and a rectifier consisting of a ring rotating with the armature and divided into as many sections as there are pole-pieces of the field-magnets, a number of continuous rings rotating with the armature and each connected with one of the sections of the divided ring, and stationary collecting devices, such as brushes, engaging the continuous rings and the sectional ring respectively, one set of said collecting devices being connected with the transformer, and the other with the consumption apparatus.

6. An electrical apparatus comprising field-magnets, a rotary armature, stationary devices, such as brushes, for conveying a current to said armature, collecting devices for taking an alternating current off the same points of the armature as said points rotate with the armature, a transformer for converting the said alternating current into one of different voltage, and a rectifier consisting of a ring rotating with the armature and divided into as many sections as there are pole-pieces of the field-magnets, a number of continuous rings rotating with the armature and each connected with one of the sections of the divided ring, and stationary collecting devices, such as brushes, engaging the continuous rings and the sectional ring respectively, one set of said collecting devices being connected with the transformer, and the other with the consumption apparatus, those collecting devices which engage the sectional ring being adjustable by turning them about the axis of the armature.

The foregoing specification of our "improved method of and apparatus for transforming continuous electric currents into continuous currents of different voltage" signed by us this 10th day of April, 1899.

ALFRED WYDTS.
GUSTAVE WEISSMANN.

Witnesses:
  EDWARD P. MACLEAN,
  MAURICE HENRI PIGNET.